Dec. 18, 1923.
I. H. LEVIN
1,478,341
ELECTROLYTIC CELL
Original Filed Jan. 14, 1920
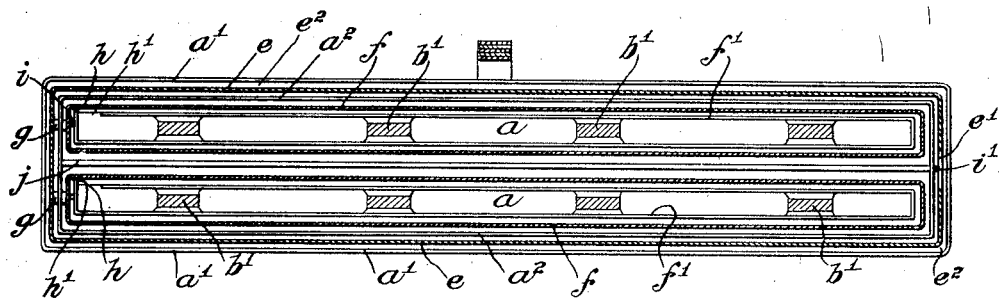
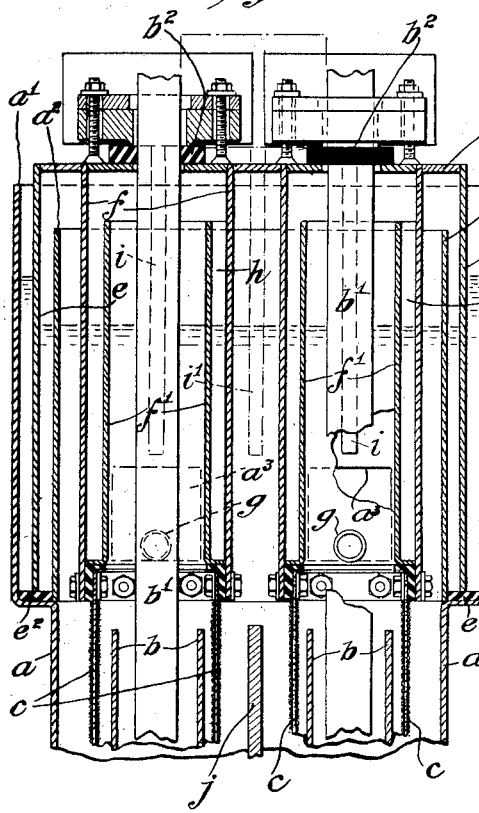
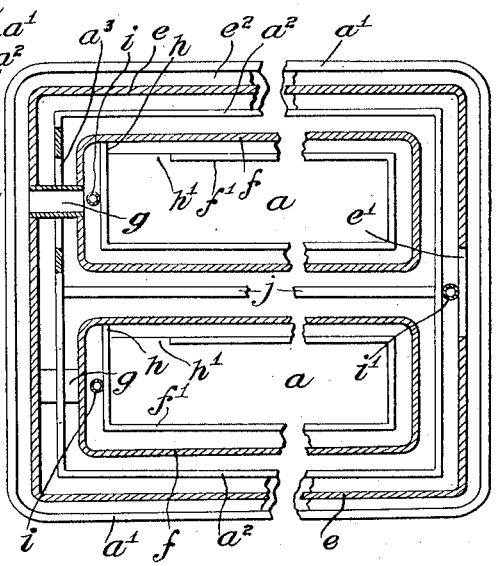
Isaac H. Levin INVENTOR
Frank P. Wentworth
his ATTORNEY Patented Dec. 18, 1923.

1,478,341

UNITED STATES PATENT OFFICE.

ISAAC H. LEVIN, OF NEW YORK, N. Y.

ELECTROLYTIC CELL.

Application filed January 14, 1920, Serial No. 351,364. Renewed April 24, 1923.

*To all whom it may concern:*

Be it known that I, ISAAC H. LEVIN, a citizen of the United States, residing at the borough of Manhattan, city, county, and State of New York, have invented certain new and useful Improvements in Electrolytic Cells, of which the following is a specification, reference being had therein to the accompanying drawings, which form a part thereof.

My invention relates to uni-polar electrolytic cells, and more particularly to the electrolyte circulating system adjacent the top of a cell of a type wherein the tank for the electrolyte forms the outer electrode, and the cover supported by, but insulated from, said tank is so constructed as to form gas chambers adjacent the top of the cell.

In the present application it is not my intention to claim the characteristics of the cell relating to the generation of, and accumlation of, the gases, such being made the subject matter of my co-pending application Serial No. 351,363.

In a cell of this type a porous, gas impervious diaphragm, usually made of asbestos, and supported by the means forming the gas chamber above the inner electrode, is interposed between the inner and the outer electrode, the main purpose of the invention being to provide means whereby the electrolyte adjacent the top of the tank may flow from adjacent one electrode to adjacent the other without likelihood of gas bubbles being carried therewith so as to convey hydrogen to the oxygen gas chamber and oxygen to the hydrogen gas chamber, causing impurity in either gas generated or such an admixture of the gases within the cell as might result in dangerous conditions during its operation.

The circulating system of my invention is such that the electrolyte in flowing from adjacent either electrode to adjacent the other will pass through a tortuous channel of sufficient length to ensure the substantially complete separation of any gas bubbles therefrom before it can enter the tank adjacent the other electrode, a portion of the channel through which the electrolyte must thus flow, being open to atmosphere, and other portions thereof opening into said gas chambers respectively so that gas from the bubbles bursting within each of the portions communicating with a gas chamber will be discharged within a chamber containing the same gas, and the gas from bubbles bursting in the portion communicating with atmosphere, which may be either or both gases being generated, will be discharged exteriorly of the cell, thus precluding all possibility of bubbles containing one gas being conveyed by the flowing electrolyte into a portion of the channel within the gas chamber containing the other gas.

By thus providing a channel open to atmosphere, I secure the advantage that the flowing electrolyte, after passing through that portion of the channel which is exposed within a gas chamber, is, as it enters the chamber open to atmosphere, subjected to a slight reduction of pressure which will tend to effect a more thorough separation of the gas bubbles from the electrolyte than is secured when the electrolyte is subjected to the pressure within the cell.

Furthermore in a circulation system made in accordance with my invention, in the event of the development of excessive pressures within the cell, or of the attainment of a subnormal level of the electrolyte therein, gas from either or both chambers will be vented directly to atmosphere through a portion of the circulating channel, and thus minimize likelihood of danger from such conditions within the cell.

While the essential characteristic of the invention is the employment of an outer trough formed about the top of the tank forming the outer electrode and consisting of two connected channels, the outer of which opens to atmosphere at the top thereof, and the inner of which communicates with the tank below the gas chamber above said outer electrode, and opens within said chamber at the top thereof, and an inner trough the channel of which communicates with the tank below the gas chamber above the inner electrode and opens within said chamber at the top thereof, and also communicates with the outer channel of the outer trough, so as to ensure continuity of the flow of the electrolyte through at least a substantial portion of all of said channels in passing from adjacent one electrode to adjacent the other, I so connect these troughs that gas bubbles contained in the electrolyte flowing from the inner trough will accumulate and merge in larger bubbles prior to their delivery to the outer channel of the outer trough, and thus minimize the likelihood of small bubbles, particularly those containing oxygen, being carried into the inner channel of the outer trough.

The electrolyte itself forms the only liquid seals present in the cell, so that the conditions within a cell may ordinarily be determined by the level of the electrolyte in the outer channel of the outer trough. This condition also avoids the necessity for special attention to the seal about the cover and troubles resulting from condensation of the distilled water when such is used solely as a hydraulic joint about the top of the tank.

While the two connected channels of the outer trough are formed by a baffle carried by the cover, short circuiting of the cell through the cover is prevented by insulating the cover from both electrodes.

Since the trough arrangement essential to my invention is solely for ensuring a proper circulation of the electrolyte, any desired method of feeding distilled water into the tank may be employed, although such feed water if desired may be delivered directly to the outer channel of the outer trough from whence it will be conveyed as a result of the normal circulation of the electrolyte, to within the tank.

Although either gas will be vented to atmosphere through the trough arrangement referred to, in the event of the development of excessive gas pressure in either gas chamber, or a sufficient lowering of the level of the electrolyte from any cause, I may also provide for special vents communicating with each gas chamber, which will vent such gases before the level of the electrolyte becomes sufficiently low to permit the venting of the gas through said troughs.

The invention consists primarily in an electrolytic cell embodying therein an outer electrode forming a tank for the electrolyte, an inner electrode within said tank, a diaphragm separating said electrodes, a cover for said tank forming non-communicating gas chambers adjacent said inner and outer electrodes respectively, and a circulation system whereby electrolyte may flow from adjacent one electrode to adjacent the other, comprising a tortuous, continuous channel, one end of which communicates with the interior of said tank adjacent said inner electrode, and the other end of which communicates with the interior of said tank adjacent said outer electrode, one portion of said channel opening at the top thereof into the gas chamber above said inner electrode, another portion thereof opening at the top adjacent said outer electrode and an intermediate portion thereof communicating with atmosphere, whereby gas bubbles will be separated from the electrolyte flowing through said channel, and gas freed by the bursting of bubbles will be discharged into a gas chamber containing the same kind of gas, while any gas not thus freed will be discharged into atmosphere, and in such other novel features of construction and combination of parts as are hereinafter set forth and described, and more particularly pointed out in the claims hereto appended.

Referring to the drawings,

Fig. 1 is a view of an electrolytic cell embodying a circulation system in accordance with my invention, upon a horizontal section above the top of the tank and below the cover;

Fig. 2 is a transverse section through the upper part of the cell; and

Fig. 3 is a detail view upon an enlarged scale showing the opposite ends of the tortuous channel of the circulation system.

Like letters refer to like parts throughout the several views.

In the embodiment of the invention shown in the drawings, I employ a tank $a$ forming the outer electrode and having about the top thereof a trough formed by the offset portion $a'$ and a wall $a^2$ within same. Supported in any desired manner within the tank is an inner electrode $b$ which may be of any desired construction, there being interposed between said electrodes a diaphragm $c$ which ordinarily is of absorbent, gas impervious material such as asbestos. Closing the top of the tank $a$ is a cover $d$ having about the edge thereof a pendent baffle $e$ dividing the trough formed by the portion $a'$ and wall $a^2$ into two channels which communicate with each other through the opening $e'$ adjacent one end of the tank. The baffle $e$ seats upon a packing band $e^2$ within the bottom of the said trough, so as to form a liquid and gas-tight joint about the lower edge of said baffle, and at the same time insulate the cover from said tank $a$.

Said cover $d$ also carries a continuous baffle $f$ extending about and above the inner electrode $b$, this baffle forming a gas chamber immediately above said inner electrode and co-operating with the baffle $e$ in forming a second gas chamber adjacent said outer electrode. Said gas chambers are non-communicating and each is provided with a separate gas offtake system not shown in the drawings, as such forms no part of my present invention. The diaphragm $c$ is connected with and supported from the lower edge of the baffle $f$ in any desired manner, the construction shown in the drawings being that used for a special form of diaphragm which forms no part of my present invention.

The electrode terminal bars $b'$ in the form of the invention shown, project through the cover $d$ and are held out of electrical engagement therewith by means of a packing gasket $b^2$ forming a gas-tight joint about said terminal bars and about the opening in the cover through which they pass. This packing mechanism, however, may take any desired form, it not being my intention in the present application to claim the particular form of packing shown.

Carried within the baffle $f$ is an angle plate $f'$ forming a trough about the inner electrode, which trough is connected by means of a substantially horizontally extending duct $g$ with the outer channel of the outer trough. Extending across the trough formed by the plate $f'$ and the baffle $f$ is a partition or barrier $h$ adjacent the duct $g$, there being on the other side of this partition or barrier an opening $h'$ communicating with the electrolyte space within the tank adjacent said inner electrode.

The duct $g$ projects through an opening $a^3$ in the inner wall $a^2$ of the outer trough, said opening being of sufficiently large dimension to prevent electrical contact between the said wall and the said duct, and thus prevent short circuiting of the cell through said duct and said cover. This opening $a^3$ also serves to place the inner channel of the outer trough in communication with the tank $a$ adjacent the outer electrode. The plates $a^2$ and $f'$ are of a height to terminate below and be spaced away from the cover $d$.

By the construction described there is presented a continuous tortuous channel, one portion of which formed by the inner trough communicates with the tank adjacent the inner electrode and has a top communicating with the gas chamber above said electrode; another portion of which formed by the inner channel of the outer trough communicates with the interior of the cell adjacent the outer electrode and has an open top discharging with the gas chamber adjacent said electrode, and the intermediate portion of which, formed by the outer channel of the outer trough, communicates with atmosphere. By this arrangement the electrolyte in flowing from adjacent either electrode will have the major portion of the gas bubbles in suspension therein, separated therefrom, while in the portion of the channel adjacent the electrode at which such gas is generated, and thus cause gas freed by the bursting of such bubbles to be discharged into a gas chamber containing the same kind of gas, while any gas bubbles not thus separated, will pass into that portion of the channel communicating with atmosphere, and be separated from the electrolyte, before passing to the portion adjacent the electrode of opposite polarity to that at which they are generated.

While the gases may be vented to atmosphere from either gas chamber through the circulation system above described, in the event of conditions in a cell resulting in a blow-out, I may provide vent pipes such as $i'—i'$, the lower end of one of which communicates with the inner channel of the outer trough on a level above the top of the opening $e'$, and the lower end of the other of which communicates with the inner trough on a level above the duct $g$. The tops of both of these vent pipes pass through and are secured to the cover $d$ by means of a gas-tight joint and open to atmosphere so that gas may be vented therethrough before the electrolyte in the tank reaches a level which will permit the gases to escape through the duct $g$ or the openings $e'$. These pipes may be surmounted by fill cups so as to serve as a distilled water feed for the cell, if so desired. Such vent pipes, however, may be dispensed with entirely and the circulation system relied upon to vent the gases in the event of a blow-out.

In the accompanying drawings, I have shown the tank $a$ as having a partition $j$ between two inner electrodes, or a multiple unit type of cell, although it is apparent that the cell may be made narrower and one of the inner electrodes and its appurtenances dispensed with, if so desired.

The operation of the circulation system herein described is substantially as follows:—

Under normal working conditions, the level of the electrolyte will be sufficiently high to extend well above the opening $e'$ and the duct $g$, while yet being below the tops of the wall $a^2$ and the plate $f'$, and the channel of the circulation troughs will contain sufficient electrolyte to prevent the escape of gases through the outer channel of the outer trough, and through the vent pipes $i$ and $i'$, if such be used.

With the decomposition of the water of the electrolyte or varying pressure conditions within the cell resulting from the accumulation of the different gases in the chambers adjacent the outer electrode and above the inner electrode, there will be a tendency of the level of the electrolyte to vary adjacent these electrodes respectively, thus setting up a circulation of the electrolyte through the trough system described.

When the gas pressure within each of the gas chambers is the same, distilled water or electrolyte will flow from the inner trough through the opening $h'$ and from the outer trough the opening $a^3$ to within the tank adjacent the inner and outer electrodes respectively, water from the outer channel of the outer trough flowing through the duct $g$ and through the opening $e'$ to replace the water or electrolyte thus fed to within the tank in said inner channels of said inner trough. If, however, the pressure in one gas chamber, such as that adjacent the outer electrode, which is usually the cathode, becomes higher than that adjacent the inner electrode, which is usually the anode, electrolyte will flow from adjacent said outer electrode through the opening $a^3$ about the inner channel until it reaches the opening $e'$, thence through the outer channel to the duct $g$, through said duct to the inner trough and about said inner trough to the opening $h'$ through which it will be discharged within the tank adjacent the inner electrode.

While the electrolyte is thus flowing in the inner channel of the outer trough, gas bubbles in suspension therein will merge into larger bubbles and burst, the gas thus freed passing through the open top of this channel to within the gas chamber adjacent said outer electrode, which chamber will contain the same gas as that thus liberated. The length of this channel is sufficiently great to ordinarily separate all of such gas bubbles from the flowing electrolyte, but if some bubbles are not thus separated they will flow with the electrolyte through the opening $e'$ into the outer channel of the outer trough about which they must flow for a considerable distance before reaching the duct $g$, so that they will have ample opportunity, while flowing through this channel, which is open to atmosphere, to merge in larger bubbles and burst before reaching the said duct.

As heretofore stated, the fact that the pressure to which the flowing electrolyte is exposed while in this outer channel, is slightly lower than the pressure within the gas chamber, will have a tendency to facilitate this separation of the bubbles from the liquid. Hence no gas bubbles will be conveyed to the inner trough through the duct $g$.

If, on the other hand, the flow of the electrolyte be in the other direction, it would pass through the opening $h'$ along substantially the entire length of the inner trough, where gas bubbles will be merged in larger bubbles and burst, the freed oxygen thus being discharged into the oxygen chamber adjacent and above the inner electrode, or anode.

If all such bubbles are not thus separated while in the inner trough, they will have a tendency to accumulate upon the substantially horizontally extending duct $g$ while the electrolyte in which they are in suspension is passing from the inner trough to the outer channel of the outer trough, through said duct, and thus be discharged from said duct into said outer channel in the form of gas so as to preclude any possibility of gas bubbles being conveyed through said outer channel to the opening $e'$ through which the electrolyte flows to the inner channel of the outer trough.

After entering said inner channel, the electrolyte, free of bubbles of oxygen, will pass about said inner trough to the opening $a^3$ through which it will flow to the tank adjacent the outer electrode.

The differential of pressure upon the electrolyte in said outer channel and the electrolyte in the inner trough will facilitate the thorough separation of the gas bubbles from the flowing electrolyte in the same manner referred to above in connection with the electrolyte flowing from adjacent the outer electrode.

By having the openings $a^3$ and $e'$ and the duct $g$ below the normal level of the electrolyte in the cell, the bubbles accumulated at the top of the electrolyte in said trough and said inner channel will be retained within said trough and said channel respectively, thus limiting the quantity of bubbles escaping with the flowing electrolyte through said openings and said duct.

The channels of the outer trough, the inner trough and the duct $g$ or other means of communication between the outer channel of the outer trough and said inner trough, form a continuous tortuous channel of considerable length, one end of which opens into the tank adjacent one electrode and the other end of which opens into the tank adjacent the other electrode, a portion of said channel adjacent one end opening at the top thereof into the gas chamber adjacent one electrode, a portion thereof adjacent the other end opening at the top thereof into the gas chamber adjacent the other electrode, and the intermediate portion opening into atmosphere so as to prevent intermingling of gases in this intermediate portion of the channel, and as stated, effectively prevent oxygen bubbles being carried to the tank adjacent the cathode and hydrogen bubbles being carried to the tank adjacent the anode.

In the event of the level of the electrolyte becoming subnormal to an extent to expose the openings $a^3$—$e'$ and the duct $g$ to the gas accumulated in the non-communicating gas chambers, each gas will flow to atmosphere through said outer channel at points remote from each other, and thus prevent the development of dangerous conditions within the cell.

The vent pipes $i$—$i'$ may be used to relieve gas pressures within the different gas chambers before said openings and said duct are thus exposed, to prevent a possible blow-out through the outer channel of the outer trough, or the overflowing of said outer channel in the event of the development of excessive gas pressures within the cell.

It will be observed that the flow of gas from the gas chamber through the circulation system, under normal working conditions, is prevented by having the openings $a^3$—$e'$ and the duct $g$ below the normal level of the electrolyte, thus dispensing with the hydraulic joints frequently employed in electrolytic cells. By forming a gas and liquid-tight joint about the lower edge of the baffle $e$, the flow of the electrolyte along a substantial portion of the inner channel of the outer trough before entering the outer channel, is assured, as well as the flow of the electrolyte through the outer channel before it can enter the inner channel when the flow is in the opposite direction.

At all times, the diaphragm $c$ is below the normal level of the electrolyte in the cell so as to prevent passage of gas therethrough from adjacent one electrode to adjacent the other electrode.

The cover $d$ is so supported and insulated from the electrodes of opposite polarity as to be maintained out of the path of the current flowing through the cell.

Where a multiple unit cell structure is employed, the operation will be identical with that heretofore described, each inner electrode having its individual inner trough connected with the outer channel of an outer trough common to both electrodes. Of course it is apparent that the number of inner electrodes may be increased or decreased, as desired, without effecting the results secured by the circulation system of my invention.

It is not my intention to limit the invention to the precise details of construction shown in the accompanying drawings, it being apparent that such may be varied without departing from the spirit and scope of the invention.

Having described the invention, what I claim as new and desire to have protected by Letters Patent, is:—

1. An electrolytic cell embodying therein an outer electrode forming a tank for the electrolyte, an inner electrode within said tank, a diaphragm separating said electrodes, a cover for said tank forming non-communicating gas chambers adjacent said inner and outer electrodes respectively, and a circulation system whereby electrolyte may flow from adjacent one electrode to adjacent the other, comprising a tortuous, continuous channel, one end of which communicates with the interior of said tank adjacent said inner electrode, and the other end of which communicates with the interior of said tank adjacent said outer electrode, one portion of said channel opening at the top thereof into the gas chamber above said inner electrode, another portion thereof opening at the top adjacent said outer electrode and an intermediate portion thereof communicating with atmosphere, whereby gas bubbles will be separated from the electrolyte flowing through said channel, and gas freed by the bursting of bubbles will be discharged into a gas chamber containing the same kind of gas, while any gas not thus freed will be discharged into atmosphere.

2. An electrolytic cell embodying therein an outer electrode comprising a tank adapted to contain electrolyte, an inner electrode, a cover for said tank, means carried by said cover forming two non-communicating gas chambers, one adjacent the top of said outer electrode and the other above said inner electrode, an absorbent gas impervious diaphragm extending about said inner electrode and supported by the means forming the gas chamber above same, below the normal level of the electrolyte in said tank, means co-operating with the means carried by said cover forming said gas chambers respectively, forming an outer trough having an outer and an inner communicating channel, the outer of which opens to atmosphere and the inner of which opens into the gas chamber adjacent said outer electrode, and an inner trough communicating with the gas chamber above and with the tank adjacent said inner electrode, and a tube connecting said inner trough and the outer channel of said outer trough, the opening in said outer trough connecting the channels thereof, and said tube, being below the normal level of the electrolyte in said tank.

3. An electrolytic cell embodying therein an outer electrode comprising a tank adapted to contain electrolyte, means forming a trough about the top of said tank, an inner electrode, a cover for said tank, a baffle carried by said cover and projecting within said trough, whereby an outer channel having its top open to atmosphere and an inner channel having its top opening within said tank, are formed, said baffle having an opening therethrough connecting said channels, and the inner wall of said trough having an opening therethrough communicating with said tank remote from the opening through said baffle, a second baffle carried by said cover extending about and above said inner electrode and forming with said first named baffle, two non-communicating gas chambers, means forming a trough having an open top within said last named baffle, a tube connecting said last named trough and the outer channel of said first named trough, an opening in said last named trough communicating with the interior of said tank, a barrier in said last named trough between said tube and said last named opening, said opening in said first named baffle and said tube being below the normal level of the electrolyte in said tank, and an absorbent gas impervious diaphragm extending about said inner electrode and supported by the baffle forming the gas chamber above same, and positioned below the normal level of the electrolyte in said tank.

4. An electrolytic cell embodying therein an outer electrode comprising a tank adapted to contain electrolyte, and an inner wall forming, with the upper edge thereof, an outer trough about the top of said tank, an opening through said wall communicating with the interior of the tank, an inner electrode, a cover for said tank, a baffle carried thereby extending into said trough and dividing it into an inner and an outer channel communicating with each other through an opening in said baffle remote from the opening through said wall, an insulating strip forming a liquid and gas-tight joint about the bottom of said baffle, a baffle carried by said cover extending about and above said inner electrode and forming with said first named baffle, two non-communicating gas chambers, means forming an inner trough within said last named baffle communicating with the electrolyte adjacent said inner electrode and with said outer channel of said outer trough, and an absorbent gas impervious diaphragm extending about said inner electrode and supported by said last named baffle, said diaphragm and said opening in said first named baffle being below the normal level of the electrolyte in said cell, the tops of said inner trough and the inner channel discharging into said gas chambers respectively, and the top of said outer channel of said outer trough being open to atmosphere.

5. An electrolytic cell embodying therein an outer electrode comprising a tank adapted to contain electrolyte, means forming a trough about the top of said tank, an inner electrode, a cover for said tank, a baffle carried by said cover and projecting within said trough, whereby an outer channel having its top open to atmosphere and an inner channel having its top opening within said tank, are formed, said baffle having an opening therethrough connecting said channels, and the inner wall of said trough having an opening therethrough communicating with said tank remote from the opening through said baffle, insulating means forming a liquid and gas-tight joint between the lower edge of said baffle and said outer trough, a second baffle carried by said cover extending about and above said inner electrode and forming with said first named baffle, two non-communicating gas chambers, means forming a trough having an open top within said last named baffle, a tube connecting said last named trough and the outer channel of said first named trough, an opening in said last named trough communicating with the interior of said tank, a barrier in said last named trough between said tube and said last named opening, said opening in said first named baffle and said tube being below the normal level of the electrolyte in said tank, and an absorbent gas impervious diaphragm extending about said inner electrode and supported by the baffle forming the gas chamber above same, and positioned below the normal level of the electrolyte in said tank.

6. An electrolytic cell embodying therein an outer electrode forming a tank for the electrolyte, an inner electrode within said tank, a diaphragm separating said electrodes, a cover for said tank forming non-communicating gas chambers adjacent said inner and outer electrodes respectively, and a circulation system whereby electrolyte may flow from adjacent one electrode to adjacent the other, comprising a tortuous, continuous channel, one end of which communicates with the interior of said tank adjacent said inner electrode, and the other end of which communicates with the interior of said tank adjacent said outer electrode, one portion of said channel opening at the top thereof into the gas chamber above said inner electrode, another portion thereof opening at the top adjacent said outer electrode and an intermediate portion thereof communicating with atmosphere, whereby gas bubbles will be separated from the electrolyte flowing through said channel, and gas freed by the bursting of bubbles will be discharged into a gas chamber containing the same kind of gas, while any gas not thus freed will be discharged into atmosphere, and vent pipes each having one end opening into atmosphere and having their other ends opening into portions of said channel opening into the gas chambers adjacent said inner and said outer electrodes respectively, and positioned above the point of communication between said end portions and said intermediate portion of the channel.

7. An electrolytic cell embodying therein an outer electrode comprising a tank adapted to contain electrolyte, means forming a trough about the top of said tank, an inner electrode, a cover for said tank, a baffle carried by said cover and projecting within said trough, whereby an outer channel having its top open to atmosphere and an inner channel having its top opening within said tank, are formed, said baffle having an opening therethrough connecting said channels, and the inner wall of said trough having an opening therethrough communicating with said tank remote from the opening through said baffle, a second baffle carried by said cover extending about and above said inner electrode and forming with said first named baffle, two non-communicating gas chambers, means forming a trough having an open top within said last named baffle, a tube connecting said last named trough and the outer channel of said first named trough, an opening in said last named trough communicating with the interior of said tank, a barrier in said last named trough between said tube and said last named opening, said opening in said first named baffle and said tube being below the normal level of the electrolyte in said tank, and an absorbent gas impervious diaphragm extending about said inner electrode and supported by the baffle forming the gas chamber above same, and positioned below the normal level of the electrolyte in said tank, and vent pipes each having one end opening into atmosphere and having their other ends opening into the inner channel of said first named trough and the inner trough respectively, and positioned above the opening connecting the channels of said first named trough and the tube connecting said inner trough and the outer channel of said first named trough.

8. An electrolytic cell embodying therein an outer electrode comprising a tank adapted to contain electrolyte, an inner electrode, a cover for, and insulated from, said tank forming non-communicating gas chambers above said inner electrode and above and about said outer electrode, means carried by said cover and co-operating with the upper edge of said tank, whereby a channel open to atmosphere is formed about the top thereof, said channel being in communication with said tank below the normal level of the electrolyte therein, whereby electrolyte may flow between said channel and said tank and the level of the electrolyte and the pressure conditions within said tank, will determine the level of the liquid in said channel, and a diaphragm between said electrodes.

9. An electrolytic cell embodying therein an outer electrode comprising a tank adapted to contain electrolyte, an inner electrode, a cover for, and insulated from, said tank forming non-communicating gas chambers about said inner electrode and above and about said outer electrode, means carried by said cover and co-operating with the upper edge of said tank, whereby a channel open to atmosphere is formed about the top thereof, non-communicating means through which said channel is in communication with said tank adjacent both said inner and said outer electrodes and below the normal level of the electrolyte in the tank, and a diaphragm between said electrodes.

10. An electrolytic cell embodying therein an outer electrode forming a tank for the electrolyte, a plurality of inner electrodes within said tank, a partition mechanically and electrically connected with said tank between said inner electrodes respectively, a diaphragm separating each of said electrodes from said tank and said partition, a cover for said tank, means forming a trough about the top of said tank, the inner wall of which has an opening communicating with the interior of the tank, a baffle carried by said cover and projecting within said trough, whereby an outer channel having its top open to atmosphere and an inner channel having its top opening within said tank, are formed, said baffle having an opening therethrough connecting said channels, and the inner wall of said trough having an opening therethrough communicating with said tank remote from the opening through said baffle, baffles carried by said cover extending about and above said inner electrodes respectively and forming with said first named baffle, non-communicating gas chambers, one above each inner electrode and one adjacent said outer electrode, means forming a trough having an open top within each of said last named baffles, and a tube connecting each of said last named troughs and the outer channel of said first named trough, each of said last named troughs having an opening therethrough communicating with the tank adjacent each of said inner electrodes, the opening in said outer trough connecting the channels thereof and said tube being below the normal level of the electrolyte in said tank.

In witness whereof I have hereunto affixed my signature, in the presence of two subscribing witnesses, this 12th day of January, 1920.

ISAAC H. LEVIN.

Witnesses:
D. J. TONKOWSKY,
F. T. WENTWORTH.